Figure 3:
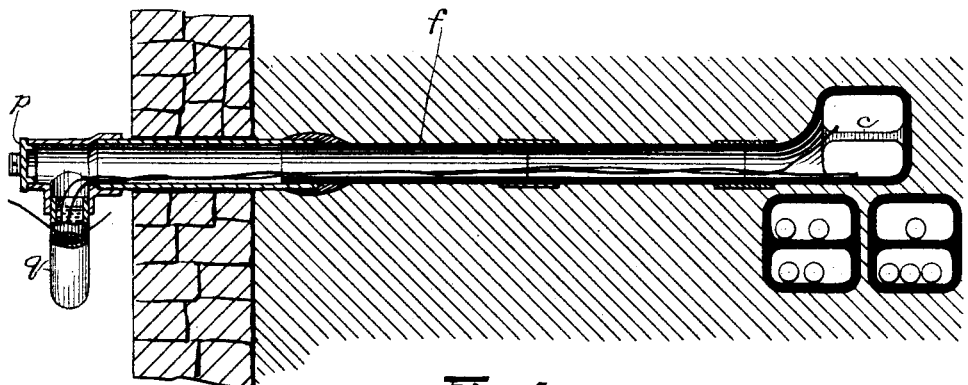

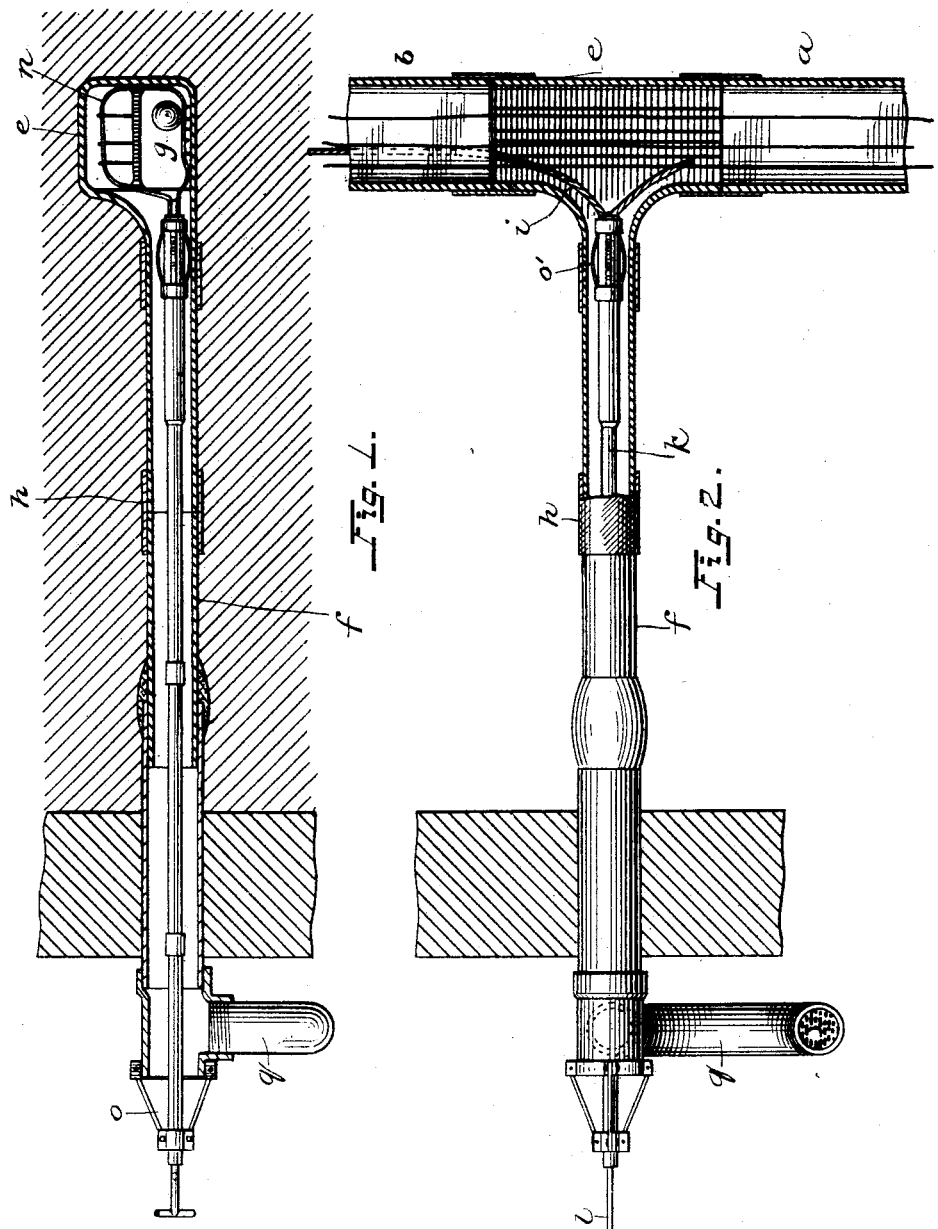

(No Model.) 2 Sheets—Sheet 2.

C. H. WILSON.
CONDUIT FOR ELECTRIC WIRES.

No. 473,044. Patented Apr. 19, 1892.

Witnesses.
Charles G. Hawley.
Geo. R. Parker.

Inventor.
Charles H. Wilson
By Geo. P. Barton
Attorney

UNITED STATES PATENT OFFICE.

CHARLES H. WILSON, OF CHICAGO, ILLINOIS, ASSIGNOR TO THE AMERICAN BELL TELEPHONE COMPANY, OF BOSTON, MASSACHUSETTS.

CONDUIT FOR ELECTRIC WIRES.

SPECIFICATION forming part of Letters Patent No. 473,044, dated April 19, 1892.

Application filed September 19, 1889. Serial No. 324,451. (No model.)

*To all whom it may concern:*

Be it known that I, CHARLES H. WILSON, a citizen of the United States, residing at Chicago, in the county of Cook and State of Illinois, have invented a certain new and useful Improvement in Lateral Connections for Underground Electric-Conduit Systems, (Case 5,) of which the following is a full, clear, concise, and exact description, reference being had to the accompanying drawings, forming a part of this specification.

My invention relates to underground electric-conduit systems, and more especially to the method and apparatus whereby the wires are taken out from the conduits for connection with different users. The conduits or subways may be of tile extending from vault to vault over the route traversed. The conductors are for the most part formed into cables, several of these cables being placed in each duct. Where wires are to be connected with a building laterally between two vaults they may be run singly in a separate duct or ducts, lateral pipes being provided connecting these ducts to the different buildings. The "distributing-ducts," as I term them, are preferably above the main conduits containing the cables and may conveniently be formed of tile having a central horizontal partition, the partition being omitted at each T, with which a lateral pipe is connected, as will be more full explained.

The main as well as the lateral conduits are preferably of vitrified pipe, like sewer-pipe, and the joints are made smooth on the interior and wrapped about with burlap or like strong coarse material saturated in hot asphalt, so that the joint may be tight and still at the same time slightly flexible. The portion of each lateral pipe passing through the wall of a building I preferably make of iron and provide therein a goose-neck trap, which may be filled with oil or like liquid to protect the building from any gas that might otherwise be forced through the lateral pipe from the distributing-pipe.

I provide a light guide-rod or pilot of sufficient length and size, which is placed in front of the rods when the duct is rodded, so that the rope drawn in by the rods may surely pass through the appropriate duct and through the loop which is formed in the T at the end of the lateral draw-rod. This lateral draw-rod consists, preferably, of a tube adapted to be inserted into the lateral duct from the building, this tube containing a small rod provided with a loop adapted to be expanded in the T, so as to be in position to receive the pilot when the same is inserted through either of the distributing-ducts of the distributing-pipe. This lateral draw-rod is preferably formed of sections of pipe adapted to be screwed together, so that the proper length of rod may be had in each particular instance. The contained small rod may also be in sections, and at its interior end is provided a head so arranged in connection with a loop that the loop may be expanded in the T to be in position to receive the pilot when inserted through either of the main ducts of the distributing-pipe. This small rod may be moved longitudinally back and forth within the tube, but is prevented from turning therein by a block contained in the head, through which passes a square section of the small rod.

My invention is illustrated in the accompanying drawings, in which—

Figure 4:
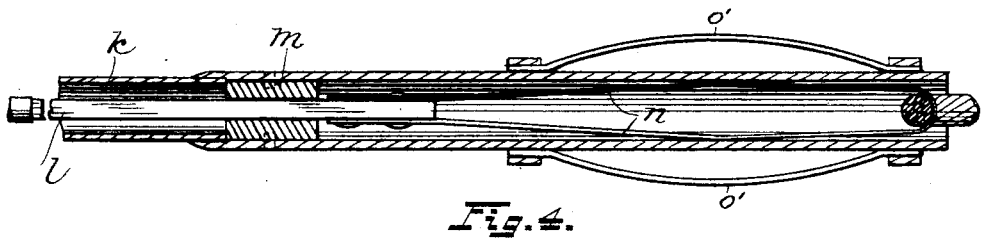
Figure 5:
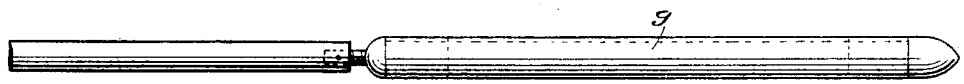
Figure 6:
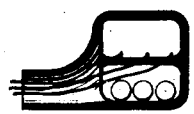

Figure 1 is a longitudinal central sectional view of a lateral duct with the lateral draw-rod inserted therein and the pilot entering the loop, the loop being expanded in the joint of the T. Fig. 2 is a plan view of the same, showing the wires crossing the T in the distributing-pipe and the rope which has been inserted through the loop as it is being drawn out through the lateral pipe by the lateral draw-rod. Fig. 3 is a longitudinal sectional view of the lateral pipe entering a building, one wire from each duct of the distributing-pipe being shown passing through the same and through the trap, the main pipes containing the cables being shown below the distributing-pipe. Fig. 4 is a detailed view of the head of the lateral draw-rod. Fig. 5 is an elevation of the pilot, which is adapted to precede the rod when a duct is rodded for the purpose of drawing a rope therein. Fig. 6 shows cables in the lower duct of the distributing-pipe.

Like parts are indicated by similar letters of reference throughout the different figures.

The distributing-pipe is formed of vitrified pipe, the different sections a b of the pipe being provided with a horizontal partition c, so that the distributing-pipe contains two ducts, one placed above the other. A T e is provided wherever a lateral pipe f is to be connected with the distributing-pipe. This T e, it will be observed, as shown more clearly in Fig. 2, is not provided with the partition c. The wires, however, are threaded across through their appropriate ducts by the use of the pilot g, this guide being of such length and of such light material, preferably paper, that it will follow whichever duct it may be started in without being obstructed at the T. Burlap or like strong coarse material h, saturated in hot asphalt, is wound about the joints, as shown, so that they may be water-proof and yet slightly flexible. The pipes or subways are conveniently run from one vault to another in the well-known way. Preferably the wires that are to be distributed are run in the upper pipe, while the wires made up in cables are run in the pipes below, as shown in Fig. 3.

It will be understood that there will be usually several lateral pipes f from each distributing-pipe between two vaults, and hence there will be wires in the ducts passing through the T at each point where there is a lateral pipe f. Thus, as shown in Fig. 2, there are three wires running through the upper duct and four wires through the lower duct across the T e, and the rope i, which has been drawn through the lower duct, has been grasped by the loop of the lateral draw-rod and is shown in position to be drawn through the lateral pipe f. After it is thus drawn through the wires will be attached to the other end of the rope, as at a vault, when it may be drawn into position through the lateral pipe by the rope i in the ordinary way. Several wires may, if desired, be drawn in at once, or a cable of wires.

I wish now to explain somewhat in detail the construction of the draw-rod. This draw-rod consists of a tube k, preferably made up of sections adapted to be screwed together, a small rod l being within the tube and adapted to be moved longitudinally therein, but prevented from turning by a guide-block m, which is provided with a shoulder corresponding to an angle upon a section of the rod passing through the same. A loop n of spring metal is provided upon the end of rod l. This loop is adapted to be expanded, as shown in Fig. 1, so as to crowd away any wires that may be in the distributing-pipe at the T. The loop is thus in position, like the eye of a needle, to permit of the pilot g being pushed therethrough, whether inserted through the upper or lower duct. By means of a clamp o the lateral draw-rod is held when desired in the position shown in Fig. 1, the clamp being loosened, so as to permit the rod l to be withdrawn, when it is desired to draw the rope i through the lateral pipe f. When the draw-rod is to be inserted, the small rod l is withdrawn, so as to bring the loop n within the head. The draw-rod is then inserted into the lateral duct f, preferably until the head touches the farther interior wall of the T. The rod is then withdrawn eight inches, or whatever may be the width of the duct, after which the small rod l is forced in through the tube k, and the loop n is thus expanded in the T-joint, as shown in Fig. 1, the direction of the loop being controlled by the handle of rod l. Being thus inserted, the clamp o is tightened. The loop n is then in position to receive the pilot g, when it shall be forced through by the rodding operation.

I have not deemed it necessary to illustrate the rodding process in detail. It is well known to those having to do with underground conduits. The guide g is placed ahead and one rod after another attached at the rear and forced through, thus forcing the pilot g through the duct, the pilot g being light and of sufficient size to surely come within the loop n in passing across the T e and to follow the same duct, whether upper or lower, into which it is first inserted. After the pilot is thus forced through, for example, from one vault to another, the rope or cord i is attached and drawn through. Thereupon the clamp o may be loosened and the small rod l drawn back through the tube k to the position shown in Figs. 2 and 4. The draw-rod then is pulled out through lateral duct f, and with it the cord i. The wire or wires attached to this cord may then be drawn in. The springs o' o' upon the head of the draw-rod of tube k serve to keep the end of the head centrally within the pipe f, so that said end will not rub against the interior thereof to obstruct its passage in any manner. The lateral pipe f is provided with a cap p, which is taken off when the draw-rod is to be inserted therein.

The trap q is filled, preferably, with oil, which is non-volatile and an insulator. Sand, however, or other suitable pulverized packing which would permit of the withdrawal of the wires, when desired, might be used in place of the oil.

Heretofore traps have been used in lateral connections of sewers and it has been usual to provide hand-holes at the junctions of the trap with the connecting-pipe for the purpose of cleaning the trap as occasion may require. Such an arrangement, however, is not suited to electric conduits, and I have therefore placed the trap out of line with the opening in the lateral pipe and provided the cap upon the inner end of the lateral pipe, so that access may be had directly through the lateral pipe to the main conduit without obstruction on account of the trap.

In Fig. 6 I have shown cables in the lower duct of the distributing-pipe e. Now, in case the loop is inserted it will ride over these heavy cables and lift any single conductors that may be in the duct above. Therefore in practice I find it preferable where a large number of wires are to be distributed to run the cables containing such wires in the lower duct and only the single wires in the upper duct, since it is not convenient to introduce single wires into a duct containing cables or cables into a duct containing single wires.

My invention admits of various modifications which would readily suggest themselves to those skilled in the art, and I therefore do not limit myself to the precise details of construction illustrated and described herein.

I do not claim, broadly, in an underground electric-conduit system the combination, with a distributing-duct accessible or open at its ends, of a service-pipe leading transversely from the distributing-duct, the service-pipe being open or accessible at its end remote from the main conduit, and a grappling device for withdrawing wires from the distributing-duct through the service-pipe.

Having thus described my invention, I claim as new and desire to secure by Letters Patent—

1. The combination, with the conduit or subway having two ducts separated by a horizontal partition and a lateral pipe extending therefrom, of a T connection at the junction of said subway and lateral pipe, the main portion of the said T being partitionless or having the full bore of the conduit-pipe, substantially as described.

2. The combination, with the conduit or subway having ducts separated by a horizontal partition and a lateral pipe extending therefrom, of a T connection at the junction of said subway and lateral pipe, the main portion of the said T being partitionless, and the said lateral pipe being provided with a draw-rod or tube and expansible loop, substantially as described.

3. The draw-rod consisting of the tube made up of joints adapted to be screwed together, in combination with the small rod inclosed therein, also composed of sections adapted to be screwed together and carrying an expansible loop, the loop being adapted to be withdrawn within the head of said tube or to be extended beyond the same and expanded, substantially as and for the purpose specified.

4. The combination, with an underground conduit, of a lateral pipe for distributing the wires leading therefrom, wires extending through said lateral pipe from said conduit, and a trap containing oil or like substance through which the conductors are run, whereby gas is prevented from penetrating through the lateral pipe into the building from the conduit, substantially as and for the purpose specified.

5. The pilot $g$ of light material, like paper, in combination with an underground conduit, said conduit being provided with two ducts, the partition between said ducts being omitted opposite the lateral connection, said pilot being longer than the omitted portion of the partition, whereby the pilot when forced through either conduit is caused to follow the same duct across the break or opening in the partition, substantially as and for the purpose specified.

6. The lateral draw-rod provided with the springs $o'$ $o'$ for preventing the end of the head from coming against the interior of the pipe, in combination with the contained rod $l$, having the loop $n$, adapted to be drawn within the head or projected in front of the same and expanded, substantially as and for the purpose specified.

7. A subway for electric conductors, formed of sections of pipe, the different sections being joined by a water-proof joint, the pipe containing a horizontal partition dividing the same into an upper and lower duct, and a T forming a part of said pipe, said T having the horizontal partition omitted, in combination with a lateral pipe extending from said T, substantially as and for the purpose specified.

8. A subway for electric conductors, formed of sections of pipe, the different sections being joined by a flexible joint, and a T forming a part of said pipe, in combination with a lateral pipe extending from said T, substantially as and for the purpose specified.

In witness whereof I hereunto subscribe my name this 16th day of September, A. D. 1889.

CHARLES H. WILSON.

Witnesses:
ELLA EDLER,
GEORGE R. PARKER.